Patented Dec. 7, 1926.

1,609,498

UNITED STATES PATENT OFFICE.

ALBERT LEEDS STILLMAN, OF PLAINFIELD. NEW JERSEY, ASSIGNOR TO THE GENERAL FUEL BRIQUETTE CORPORATION, OF NEW YORK, N. Y., A CORPORATION OF NEW YORK.

COOLING OF FUEL BRIQUETTES.

No Drawing. Application filed June 25, 1926. Serial No. 118,599.

My invention relates to the cooling or lowering of temperature of fuel briquettes as one of the final stages of operation in the manufacture thereof; and particularly fuel briquettes made with combustible binders, such as, carbohydrates or hydrocarbons, to which a heat treatment has been given after the formation of the briquettes for the purpose of carbonizing or "fixing" the binding material. Such heat treatment has been found necessary in the case of carbohydrate binders to produce briquettes that are weatherproof and waterproof as well as smokeless, and in the case of the use of hydrocarbon binders, to produce briquettes that are smokeless, strong and resistant to summer temperatures. In addition thereto, the operation to be described is applicable to fuel briquettes made wherein coking coals are added as admixture to the briquette mix for the purpose of forming a coke binder to the final product. In each of these instances the final product may be described as an agglomeration of fuel particles held in a matrix of the nature of charcoal, coke or a similar carbon.

In nearly all cases the temperatures required for the carbonization or fixing of the afore-mentioned binders or admixtures is higher than the kindling temperature of the final briquette so made. It has, therefore, proven extremely difficult—and at times impossible—to cool such briquettes in quantity by exposure to air, and frequently complete destruction of shipments has occurred through fire. Such destruction can be prevented by treating the briquettes, when discharged from the carbonizing or coking apparatus, with water, either by spray or immersion. This procedure is effective so far as cooling of the briquettes is concerned, but has the effect of impairing their structure so that they are oftentimes too weak for satisfactory shipment. The briquettes, being porous and hot, absorb water rapidly, and the heat vaporizing the water within the pores, has a rending effect. The practical result of such procedure is the arrival of cars of briquettes at destination with a large proportion of degradation. A large proportion of the briquettes has been unable to withstand the jars of shipment, and the result is a large proportion of useless fine material.

I have discovered that if such briquettes are covered by a hygroscopic material containing between 10% to 30% of moisture, the hygroscopy of the material in question serves to retain the water in suspension without permitting it to penetrate to the briquettes until it is completely vaporized by the heat of the briquettes. This application of the hygroscopy of certain materials to the cooling of porous hot materials is in effect the basis of this invention.

As an illustration of the workings of the invention and in order that one skilled in the art may make parallel applications thereto, let us assume a coal briquetting plant receiving for briquetting purposes a finely comminuted coal containing a proportion of moisture within the limits of 10% and 30%. We may assume, further, that the fuel briquettes made in this plant are treated for a period of time at 600° in order to make the binder waterproof and smokeless. Under such conditions nearly all fuel briquettes would ignite upon reaching the air, and it is, therefore, common practice to immerse them in water, to their disadvantage. According to the cooling process which I have devised, the briquettes could be carried on a conveyor line upon which would be delivered a sufficient quantity of the raw coal (the raw material above specified) to provide a sufficient amount of coal and fairly damp material to absorb the B. t. u.'s contained in the hot briquettes. As an instance we may presume ten tons of briquettes at 600° F. emerging from the carbonizing apparatus. It is desirable that they be reduced to 200° F. My cooling process would call for the contact with these briquettes of sufficient raw coal as supplied to the plant with, let us say, 15% moisture therein to insure such a drop of temperature. If ten tons per hour of coal briquettes were delivered from the carbonizer at 600° F., we may say that about four tons of such fines would be adequate to insure the drop in temperature desired. It is necessary, however, at the same time, that only sufficient of these fines be added to secure the drop in temperature without an excess of fines. Immediately after the heat transfer has taken place, which would require between 5 and 15 minutes depending upon the character of the materials used, the mass of briquettes and fine coal—the latter now dry—must be screened, and the briquettes are then ready for shipment without impairment of their strength due to moisture. It will be noted that in addition to securing an excellent cooling means this process is of value in conserving and using the sensible heat contained in the manufactured briquettes and increasing the drying capacity of the briquetting plant. As an alternative to the above procedure, the briquettes and damp coal fines may be mixed in a rotating drum whereby the speed of the heat transfer may be increased. In fact, the process may be carried out on any contact apparatus.

I claim:

1. The herein described process of cooling coal briquettes, which consists in bringing about a contact of such briquettes with hygroscopic finely divided coal saturated with moisture.

2. The herein described process of cooling coal briquettes, which consists in bringing about a contact of such briquettes with hygroscopic finely divided coal saturated with moisture, said finely divided coal consisting of sizes 3/8" and under.

3. The herein described process of cooling coal briquettes, which consists in bringing about a contact of such briquettes with hygroscopic finely divided coal containing moisture, said moisture content being between 10% and 30%.

4. The herein described process of cooling coal briquettes, which consists in bringing about a contact of hygroscopic water saturated finely divided coal with briquetted coal of the same character.

5. The herein described process of cooling hot coal briquettes, which consists in carrying them on any convenient conveying apparatus in close contact with a hygroscopic finely divided coal saturated with moisture.

6. The herein described process of cooling hot coal briquettes, which consists in bringing the hot briquettes in contact with a hygroscopic finely divided coal containing moisture, simultaneously bringing down the temperature of the briquettes and removing the moisture from the aforesaid finely divided coal and thereafter separating the briquettes from the dried fine coal by a screening operation.

7. A coal briquette made by any convenient method involving mixing, pressing and carbonizing followed by a cooling produced by contact with the hygroscopic finely divided coal containing moisture added in sufficient quantity for the contained moisture to be removed by the sensible heat of the briquette, and finally separated from the briquette by screening.

ALBERT LEEDS STILLMAN.